(No Model.)

J. AMESS.
BICYCLE.

No. 251,398. Patented Dec. 27, 1881.

Witnesses.

Inventor.

United States Patent Office.

JAMES AMESS, OF GUELPH, ONTARIO, CANADA, ASSIGNOR TO JOHN HOGAN, OF SAME PLACE.

BICYCLE.

SPECIFICATION forming part of Letters Patent No. 251,398, dated December 27, 1881.

Application filed November 8, 1881. (No model.)

*To all whom it may concern:*

Be it known that I, JAMES AMESS, of the city of Guelph, in the county of Wellington, in the Province of Ontario, Canada, have invented certain new and useful Improvements in Bicycles, of which the following is a specification.

The object of the invention is to so arrange the treadle-gear of a bicycle with the main wheel of the machine that it may be driven at a speed greater than the movement of the foot-treadle; and it consists in pivoting the foot-treadle to a large spur-wheel gearing with a pinion keyed to the shaft of the main wheel, the end of the treadle being supported on a cross-head carried in suitable guides.

Figure 1:
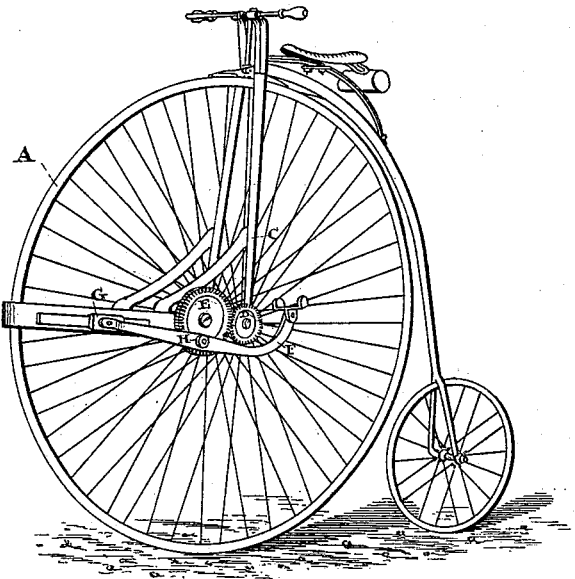
Figure 2:
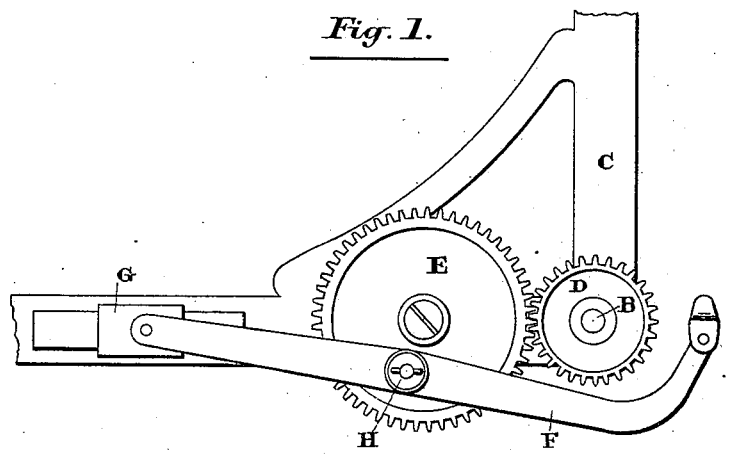

Figure 1 represents a perspective view of a bicycle provided with my improved treadle-gear. Fig. 2 is an enlarged detail of my improved treadle-gear.

A is the main wheel of the bicycle, keyed to the axle B, which is supported on both sides of the wheel in suitable bearings in the frame C.

D is a pinion keyed to the axle B, and meshing with the spur-wheel E, carried in suitable bearings fixed to the frame C.

F is a foot-treadle, one end of which is carried by the cross-head G, the other end being provided with a suitable stirrup for the foot, while at or near its center it is connected to the spur-wheel E by a suitable crank, H. The frame C, it will be noticed, extends around the main wheel A. A treadle on each side is of course necessary, and also a duplicate of the gearing mentioned. Owing to this arrangement of gearing, the rider of the bicycle is enabled to obtain great speed with very little movement of the legs, as the movement is practically vertical, and the full effect of the rider's weight thus obtained, the reciprocating stroke of the treadle being small in comparison to the power and speed obtained.

I do not confine myself to any particular size of the gearing, nor to their relative dimensions, as these may be altered to suit the taste and convenience of the manufacturers. Nor is it necessary to limit the size of the main wheel, as the end of the lever F upon which the stirrup is attached is bent upwardly, as shown. Consequently the size of the wheel or length of the rider's legs may be thus provided for. It will also be observed that this latter advantage may be secured without using the gearing, in which case the lever F should be attached direct to a crank upon the main axle B.

What I claim as my invention is—

1. In a bicycle or similar vehicle operated by treadle-power, a foot-treadle, F, having its end opposite to that upon which the stirrup is secured pivoted to a cross-head supported in suitable guides on the main frame C, in combination with the spur-wheel E, connected to the treadle F by the crank-pin and to the main axle B by the pinion D, substantially as and for the purpose specified.

2. In a bicycle or other similar vehicle operated by treadle-power, a foot-lever, F, attached to a crank upon the main axle B, and having an upwardly-bent end to carry the foot-stirrup, in combination with a cross-head, G, attached to the lever F, and arranged to support it on a suitable stud, substantially as and for the purpose specified.

JAMES AMESS.

Witnesses:
CHARLES HAUGH,
ALLAN SIMPSON.